United States Patent [19]

Agostinelli et al.

[11] Patent Number: 4,765,721
[45] Date of Patent: Aug. 23, 1988

[54] STRESS-TOLERANT LIGHT VALVE ARRAY CONSTRUCTION

[75] Inventors: John A. Agostinelli, Rochester; José M. Mir, Webster, both of N.Y.

[73] Assignee: Eastman Kodak Company, Rochester, N.Y.

[21] Appl. No.: 99,955

[22] Filed: Sep. 23, 1987

[51] Int. Cl.⁴ ............................ G02B 5/30; G02F 1/03
[52] U.S. Cl. .................................... 350/389; 350/392
[58] Field of Search ....................... 350/389, 392, 356

[56] References Cited

U.S. PATENT DOCUMENTS

| | | | |
|---|---|---|---|
| Re. 28,971 | 9/1976 | Kumada et al. | 350/389 |
| 4,229,095 | 10/1980 | Mir | 355/4 |
| 4,371,892 | 2/1983 | Mir | 358/75 |
| 4,569,573 | 2/1986 | Agostinelli | 350/320 |
| 4,707,081 | 11/1987 | Mir | 350/388 |

FOREIGN PATENT DOCUMENTS 61-90127  5/1986  Japan ................................ 350/356

Primary Examiner—John K. Corbin
Assistant Examiner—David J. Edmondson
Attorney, Agent, or Firm—John D. Husser

[57] ABSTRACT

An improved light valve device of the kind having: (i) an electro-optic modulator panel with a plurality of electrodes defining a linear array of selectively activatable modulation zones in the panel and (ii) a pair of polarizer elements sandwiching such panel and oriented with their polarization directions at 90° relative to one another. The polarization directions of the polarizers are respectively parallel and perpendicular to the linear direction of the modulation zones array and the electrodes are constructed to provide electric fields across the modulation zones in directions approximately 45° to the linear direction of the modulation zones array.

3 Claims, 2 Drawing Sheets

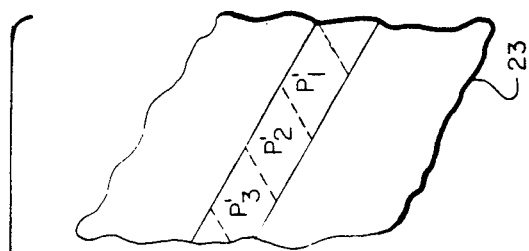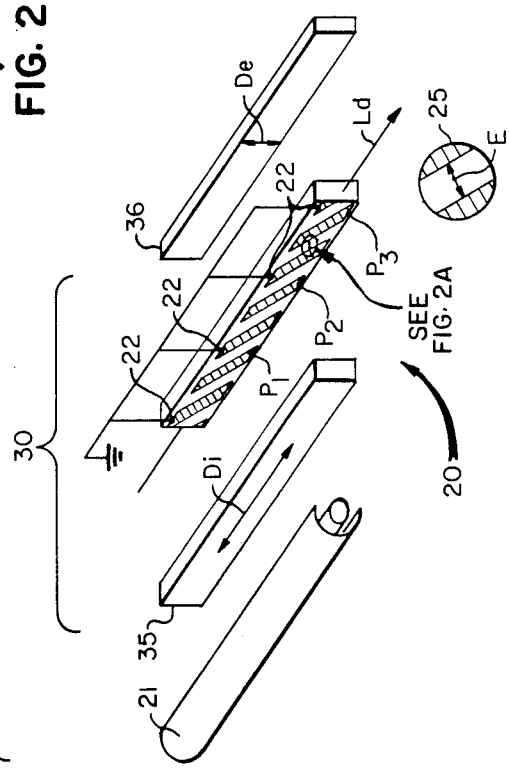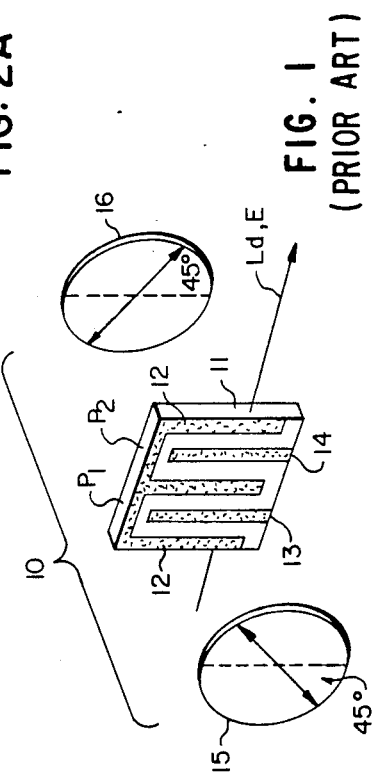

STRESS-TOLERANT LIGHT VALVE ARRAY CONSTRUCTION

FIELD OF THE INVENTION

The present invention relates to a light valve arrays of the kind comprising an electrically addressable panel of ferro-electric ceramic material (e.g. PLZT) sandwiched between crossed polarizers to operate in a quadratic Kerr cell mode, and more particularly to improved configurations for reducing stress-related, light control inaccuracies of such arrays.

BACKGROUND OF THE INVENTION

U.S. Pat. No. 4,229,095 describes one embodiment of light valve array of the kind referred to above, as employed in electronic imaging apparatus. In this embodiment the electro-optic modulator panel comprises a plurality of spaced address and reference electrodes formed on one surface of PLZT material to form a linear array of selectively addressable light control portions. The ingress and egress polarizers, sandwiching the panel, are disposed with their directions of polarization at 90° to one another, at 45° to the line direction of the linear array of light control portions and at 45° to the direction of the electric field that is selectively applied between adjacent address and reference electrodes. When a light control portion is not addressed by a transverse electric field, light from the ingress polarizer passes through that control portion unmodulated and is thereafter blocked by the egress polarizer. When a transverse addressing electric field is applied, the light polarization state is changed by the electro-optic element to an extent that it will pass the egress polarizer.

The above-described approach for electronic imaging has been found quite useful and has been the subject of various refinements. Thus, U.S. Pat. No. 4,371,892 describes techniques for optimizing the addressing potentials, applied across the light control portions, to obtain transmission uniformity. U.S. Pat. No. 4,569,573 and commonly assigned U.S. application Ser. No. 780,873, filed Sept. 27, 1985 by J. Mir, now U.S. Pat. No. 4,707,081, describe techniques for forming in-depth electrodes which improve the effectiveness of the addressing electric field, by directing it more precisely perpendicular to the direction of light propagation through the panel (and at 45° to that light's entry direction of polarization.)

SUMMARY OF THE INVENTION

The purpose of the present invention is to provide another constructional improvement for light valve array devices such as described above. More particularly, we have discovered that prior art light valve array configurations can develop a stress-related inaccuracy in their light control, e.g. caused by localized dielectric heating and/or physical distortion of mounting. The object of the present invention is to provide a light valve array construction which reduces such stress-related inaccuracies.

Thus, the present invention provides the advantage of improved light control by light valve arrays and resulting improvements in the quality of imaged formed thereby. Another advantage of the present invention is its enablement of high frequency light valve imaging operation without objectionable stress-related image artifacts. Yet another advantage of the present invention is its improved tolerance to physical mounting stresses, and thus simpler fabrication for apparatus utilizing such light valve array embodiments.

In one aspect the present invention constitutes in a light valve device of the kind having (i) an electro-optic modulator panel with a plurality of electrode means defining a linear array of selectively activatible modulation zones and (ii) a pair of polarizer elements sandwiching the panel and oriented with their polarization directions at 90° relative to one another, the improvement wherein the polarization directions of said elements are respectively parallel and perpendicular to the line direction defined by linear array of modulation zones and said electrode means are constructed to provide electric fields across the modulation zones in directions approximately 45° to said line direction.

BRIEF DESCRIPTION OF THE DRAWINGS

The subsequent description of preferred embodiments refers to the attached drawings wherein:

FIG. 1 is a schematic illustration of a prior art light valve array configuration;

FIG. 2 is a perspective schematic view of an electronic imaging system incorporating one embodiment of light valve array in accord with the present invention;

FIG. 2A is an enlarged view of a portion of the FIG. 2 modulator panel;

DETAILED DESCRIPTION OF PREFERRED EMBODIMENTS

Figure 5:
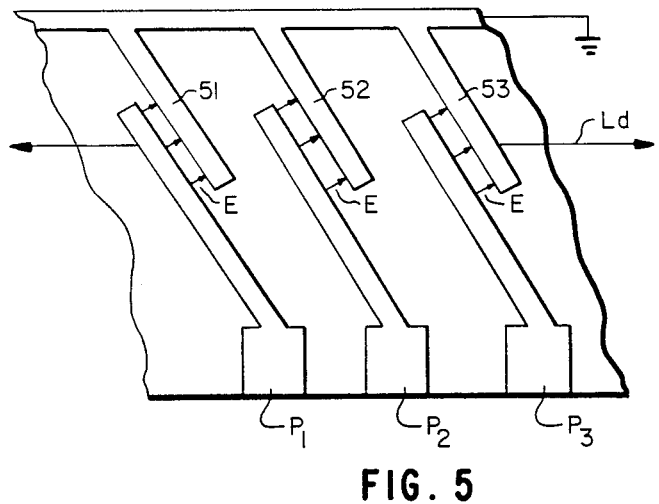
FIG. 5 is an enlarged plan view of a portion of an alternative modulator array configuration in accord with the present invention.

Before describing preferred embodiments of the present invention in detail, some further explanation of the problems which it solves will be useful. Thus, referring to FIG. 1, there is shown a typical prior art light valve array configuration, which in some modes of operation can exhibit the light leakage pattern indicated by the lobes in FIG. 3. More specifically, FIG. 1 illustrates schematically a portion of a linear light valve array 10 comprising a modulate panel 11, e.g. formed of PLZT material. On the light ingress surface of the modulator, reference electrodes 12 and address electrodes 13, 14 are formed to define light control zones $P_1$, $P_2$ along the array's linear direction $L_d$. Sandwiching the modulator panel 11 are ingress light polarizer 15 and egress light polarizer 16 which have light polarization directions as indicated by two headed arrows. As shown, the polarizers are oriented with their directions of polarization at 90° to one another. Moreover, the polarization of each polarizer is oriented at 45° to the direction E (see FIG. 2A) in which the transverse electric field is applied between reference and address electrodes 14, 13. Note, in the illustrated embodiment, the direction E is the same direction as the line $L_d$ of the linear array of light control zones $P_1$, $P_2$.

We have found that stress birefringence can be induced thermally in, and adversely affect, a light valve array such as shown in FIG. 1. Thus, high frequency operations (>10 kHz) can significantly heat operative portions of the modulator panel, due to the lossy nature of the dielectric PLZT material. Typically 5% of the energy required to operate the modulator is dissipated as heat. Since the modulator material changes dimensionally with temperature, thermal gradients in the modulator produce stress patterns. For example when a single element is heated, the adjacent material is subjected to a radial stress, thus giving rise to a heat, rather than electrical field, created birefringence in the modulator. When such element is used between a polarizer/analyzer pair in a light valve configuration, such stress birefringence will cause light to leak through the crossed polarizers.

Figure 3:
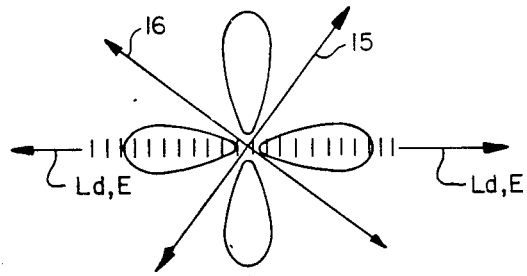
FIG. 3 is a diagram illustrating stress effects in prior art light valve array constructions such as FIG. 1.

In a linear modulator array configuration having a polarizer geometry such as shown in FIG. 1, a four-lobed leakage light pattern such as the cross-hatched pattern in FIG. 3 results from the heat stress mechanism. When an entire linear array is pulsed at high frequency, the active region heats and attempts to expand. The rest of the array material, being at a lower temperature, does not expand as much and consequently constrains the heated central region. As a result of the array's long linear geometry, the stress is compressional and along the array direction. Stress birefringence can also result from improper mounting of a linear modulator array. If the array is bowed, the material will experience a tensile or compressional stress according to the nature of the distortion. As with respect to high frequency operation heating stress, the major component of mounting stress tends to be along the array direction.

In normally isotropic materials, the principal axes of the stress induced optical anisotropy are along the principal axes of the stress system. When the polarization direction of incident linearly polarized light is at 45° to the principal axes of the stress system, and therefore at an angle of 45° with respect to the principal axes of the optical anisotropy, then the incident light is decomposed by the stressed medium into two mutually orthogonal polarizations of equal amplitude, travelling with different velocities through the stressed medium. When these two components emerge from the stressed medium, they recombine to form a polarization state which, due to the phase retardation between the components, is different from the linearly polarized incident light. This light will therefore in general by transmitted by a linear polarizer oriented at 90° to the incident light polarization direction. Thus, in the case of the stressed linear light valve array placed between crossed polarizers such that the polarization directions of the polarizers are at 45° with respect to the light valve array (FIG. 1), there will be transmission of light at points along the light valve array because of induced stress.

In considering the foregoing, we have devised a simple and effective way to greatly reduce the above-noted stress-related light valve leakages (and the resultant contrast losses). Our inventive constructions are based on several concepts. Consider, first, the normal "on-off" light valve operation performs best when the sandwiching polarizers are crossed (at about 90°) and each has its direction of polarization at about 45° to the direction of the addressing electric field in the modulator. Consider next that the directions of most troublesome stresses in linear light valve array configuration are along the linear direction of the array. Consider finally that when the direction of polarization of linearly polarized light incident on a stressed, normally isotropic medium, is parallel to one of the principal axes of the stress system and therefore to one of the principal axes of optical anisotropy, then such light emerges from the stressed medium with its polarization state unchanged. Thus, such light will be blocked by a linear polarizer oriented so that its polarization axis is aligned at 90° with respect to the direction of polarization of the light incident on the medium. So, in the case of the stressed linear light valve array placed between cross polarizers such that the polarization directions of the polarizers are parallel and perpendicular to the array direction no stress induced light leakage will emerge at points along the array direction.

Based on such analysis, we discovered a solution to the above-described stress induced light transmission inaccuracies. Thus, the linear direction of the light valve array should be oriented parallel to, or perpendicular to, the direction of polarization of the ingress light polarizer and the electric addressing means of the modulator should be configured so that their applied field directions, within the modulator medium, are at about 45° to the input light polarization direction.

Figure 4:
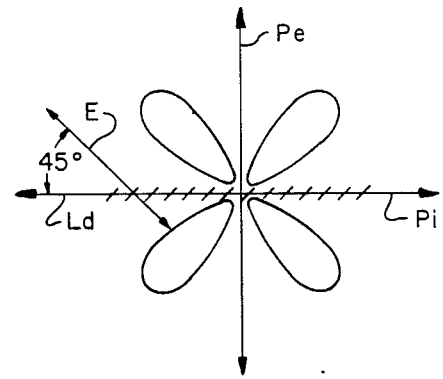
FIG. 4 is a diagram similar to FIG. 3 but illustrating the advantages in regard to stress effects in accord with the present invention.

FIG. 2 illustrates one embodiment of such a light valve configuration and the FIG. 4 diagram shows its optical results. Thus, the FIG. 2 system 20 comprises illumination source 21 which is adapted to direct light through light valve device 30 and lens 25 to a record medium 23. The device 30 comprises a modulator panel sandwiched between ingress and egress polarizer members 35, 36. As shown in FIG. 2, the modulator panel comprises a plurality of reference electrodes 22 commonly coupled to ground potential and interspersed address electrodes $P_1$, $P_2$ and $P_3$ for selectively providing a field E extending across the modulator medium toward adjacent reference electrodes. In accord with the present invention, the ingress polarizer 35 is constructed and located so that its direction of polarization $D_i$ is parallel to the linear array direction $L_d$ defined by the locus of light control portions of the modulator panel. Also, in accord with the present invention the electrodes of the modulator panel are constructed so that the addressing electric fields E which extend within the electro-optic medium are in directions approximately 45° to the direction of polarization $D_i$ of ingress polarizer 35. As illustrated, this is effected by forming linear electrodes which are disposed at an angle of about 45° to the linear array direction $L_d$. Thus the direction E of the electric field, extending transversely between adjacent electrodes, is also at about 45° to the linear array direction $L_d$.

The effects of the FIG. 2 light valve array construction can be seen in FIG. 4. Thus, the zones of possible stress induced light leakage, as illustrated by the lobes, are at 45° to the linear direction $L_d$ of the array. This is beneficial in two regards. First, the zones of the potential light leakage are offset from the major light valve areas where thermal or mechanical stress is caused for the array, i.e. offset from array direction $L_d$. Second, because the potential leakage areas are not on the direction of the array, they can be blocked, e.g. by a light opaque mask, if desired.

FIG. 5 shows another preferred embodiment of modulator panel construction in accord with the present invention. In this embodiment, the reference electrode address electrode pairs 51-$P_1$, 52-$P_2$ and 53-$P_3$ have intervening spaces. This configuration is useful in a multiplexed light valve imaging system such as described in our commonly assigned U.S. application Ser. No. 099,953, entitled "System for High Resolution Exposure Address With Coarser Resolution Exposing Array", filed Sept. 23, 1987. It will be noted, however, that like the FIG. 2 embodiment the electric fields E are directed at about 45° to the array direction $L_d$. Also, as was the case with the FIG. 2 embodiment, the ingress egress polarizers (not shown) have their polarization directions parallel and perpendicular to the direction $L_d$ and mutually perpendicular to one another.

The invention has been described in detail with particular reference to preferred embodiments thereof, but it will be understood that variations and modifications can be effected within the spirit and scope of the invention.

We claim:

1. In a light valve device of the kind having: (i) electro-optic modulator panel with a plurality of electrode means defining a linear array of selectively activatible modulation zones in the panel and (ii) a pair of polarizer elements sandwiching said panel and oriented with their polarization directions at 90° relative to one another, the improvement wherein said element polarization directions are respectively parallel and perpendicular to the linear region comprising the modulation zones defined by said electrode means and said electrode means are constructed to provide electric fields across said modulation zones in directions approximately 45° to said linear region of modulation zones.

2. An electro-optic modulator comprising a light valve array sandwiched between perpendicularly crossed polarizers, said light valve array comprising a linear direction defined by a plurality of electrically-addressable electrode pairs, each pair of electrodes located to affect electro-optic material therebetween to become birefringent in response to an electric field established thereacross, said electrodes being angularly disposed with respect to the direction of said linear array, and said crossed polarizers being arranged so that their respective directions of polarization are substantially perpendicular and parallel to the direction of the linear array.

3. The apparatus as defined by claim 2 wherein each of said electrodes is arranged at about a 45° angle relative to the direction of said linear array.

* * * * *